United States Patent [19]
Wright et al.

[11] Patent Number: 6,084,969
[45] Date of Patent: Jul. 4, 2000

[54] KEY ENCRYPTION SYSTEM AND METHOD, PAGER UNIT, AND PAGER PROXY FOR A TWO-WAY ALPHANUMERIC PAGER NETWORK

[75] Inventors: Steven R. Wright, Reston, Va.; Christopher T. Brook, Chevy Chase, Md.

[73] Assignee: V-One Corporation, Germantown, Md.

[21] Appl. No.: 09/001,463

[22] Filed: Dec. 31, 1997

[51] Int. Cl.$^7$ .............................. H04K 1/00; H04B 7/00; H04L 9/30
[52] U.S. Cl. ...................... 380/271; 455/31.3; 380/282; 713/170; 713/153
[58] Field of Search ................................. 380/21, 25, 49, 380/30, 44, 45, 271, 282; 455/31.2, 31.3; 713/170, 153

[56] References Cited

U.S. PATENT DOCUMENTS

| | | |
|---|---|---|
| 4,660,032 | 4/1987 | Tsunoda . |
| 5,285,496 | 2/1994 | Frank et al. . |
| 5,392,353 | 2/1995 | Morales ..................................... 380/20 |
| 5,452,356 | 9/1995 | Albert . |
| 5,481,255 | 1/1996 | Albert ..................................... 455/38.1 |
| 5,495,533 | 2/1996 | Linehan ..................................... 380/21 |
| 5,590,197 | 12/1996 | Chen et al. . |
| 5,604,801 | 2/1997 | Dolan ....................................... 380/21 |
| 5,638,450 | 6/1997 | Robson . |
| 5,668,876 | 9/1997 | Falk et al. . |
| 5,694,471 | 12/1997 | Chen et al. . |

OTHER PUBLICATIONS

Bruce Schneier, Applied Cryptography, Book, pp. 47–48, 397–398, 178–179, Oct. 1996.
Three brochures of Motorola obtained from http://www.Motorola.com Dec. 7, 1997 entitled "MTE Paging Network, Inc.," "FLEX™ Family of Protocols Q&A," and "ReFlex™ Two–Way Paging Protocol Q&A.".

*Primary Examiner*—Gail O. Hayes
*Assistant Examiner*—Ho S. Song
*Attorney, Agent, or Firm*—Bacon & Thomas, PLLC

[57] ABSTRACT

A method and system allows encryption services can be added to an existing wireless two-way alphanumeric pager network by providing a pager proxy which is arranged to receive an encrypted message from a sending pager and re-packages it for re-transmission to the destination pager. The sending pager encrypts the message using a session key, and encrypts the session key so that it can only be recovered by a secret key of the pager proxy. The pager proxy, upon recovery of the session key, decrypts the message, generates a new session key, re-encrypts the message, and encrypts the new session key so that it can only be recovered by a secret key of the destination pager. Encryption of the session key can either be carried out by shared secret key encryption or encryption of the session key by a public key corresponding to a private key of the pager proxy or destination pager. Authentication of the sending pager and proxy server is provided by encryption of the session keys together with identifying data, and authentication of the message is provided by a message authentication code generated by computing a message authentication code based on the session key, identifying data, and the message.

51 Claims, 10 Drawing Sheets

KEY ENCRYPTION SYSTEM AND METHOD, PAGER UNIT, AND PAGER PROXY FOR A TWO-WAY ALPHANUMERIC PAGER NETWORK

BACKGROUND OF THE INVENTION

1. Field of the Invention

This invention relates to a system and method of encrypting messages for transmission and/or receipt by a pager, and in particular to a system and method for which uses a standard two-way wireless pager protocol to send encrypted messages over an existing paging infrastructure. The invention also relates to a pager unit capable of sending and receiving encrypted alphanumeric messages over a wireless pager network, and to a pager proxy server which provides key management functions for enabling transmission of encrypted alphanumeric messages over the wireless pager network.

2. Description of Related Art

Paging systems capable of transmitting simple alphanumeric messages and displaying the messages on a miniature two-way pager are becoming increasingly popular. Such two-way paging systems enable messages like "Meet me at the gym at 6:00" or "I love you" to be both transmitted and received by equipment that is smaller, less complex, and less intrusive than a wireless telephone. The messages are transmitted as packets containing source and destination address data formatted for transmission over the response channel of a wireless paging network, using a protocol that allows users to respond to messages directly from their pager units without having to use a telephone.

Two-way pagers are currently offered by Motorola and Wireless Access, with national paging services being provided by MTEL, which uses Motorola's Re-FLEX™ paging protocol. The Re-FLEX™ paging protocol allows users to respond to messages using a selection of pre-programmed responses or by formatting a free-form text reply, and in addition includes a TCP/IP protocol stack that allows the user to initiate messages to subscribers on wired networks, including e-mail and fax machine addresses.

The present invention concerns a method and system for encrypting and authenticating messages transmitted over the existing pager system, using the Re-FLEX™ protocol, or over other yet-to-be-implemented paging systems in the U.S. and elsewhere which may or may not use the Re-FLEX™ protocol. Unlike previously proposed arrangements, which either rely on complex encoding schemes and sophisticated hardware at the sending and destination ends of a transmission, or transfer of keys and authentication of keys using a telephone rather than the wireless network, the present invention offers the advantages of (i) providing authenticable key encryption of messages at the source of the transmission and key decryption at the destination, with protection of the communication by keys that are unique to each pager, rather than shared, and yet with no need for a key exchange between the sending and destination pagers, (ii) using existing two-way pager designs and paging system infrastructure, and (iii) providing the encryption capabilities without adding to carrier overhead. The addition of full key encryption and authentication capabilities to an existing pager system without adding to carrier overhead or capital costs distinguishes the system and method of the invention from all previously proposed pager encryption schemes.

An example of a previously proposed pager encryption scheme is described in U.S. Pat. Nos. 5,452,356 and 5,481,255, assigned to Data Critical Corp. Although the term "encryption" is used in these patents, the patents are directed primarily to a data compression and encoding protocol for enabling transmission of large volumes of data over a wireless pager network using modified transmitting and receiving hardware, including separate computers at each end of the transmission. The only discussion of encryption in these patents is a cursory reference to "encryption" as an added security layer provided by utilizing a "commercially available algorithm" (see, e.g., col. 11, lines 15–32 of U.S. Pat. No. 5,452,356) during encoding of the files by a computer connected to the pager. Because all encryption and decryption in the Data Critical patents is disclosed as being carried out by software on computers connected directly to the sending and receiving pagers, the only possible ways that true key encryption could be provided for would be to use encryption keys corresponding to decryption keys common to all possible recipients of the message, to use unique keys for each potential recipient but to store the corresponding encryption keys in the sender's computer, or to exchange keys prior to a transmission. While these alternatives might be reasonable in the context of, for example, a medical paging system in which all transmissions are between doctors or trusted medical personnel, none of them are suitable for use in connection with a paging system designed to transmit simple text messages using miniature handheld paging units and which is open to the general public, both because of the hardware intensive nature of the encoding scheme and the problem of key management.

In addition to the wireless pager protocol described in the Data Critical patents the prior art includes a number of patents describing authentication or encryption schemes that are used in connection with wireless paging, but are carried out over a telephone line. The systems described in these patents are more suited to traditional one-way paging environments than with two-way protocols, even though one of the patents issued only recently, and none disclose systems that can be practically applied to the current two-way paging networks.

U.S. Pat. No. 5,668,876, for example, discloses a modified pager which provides authentication of a caller. The modified pager calculates a unique response code based on a transmitted challenge code, an input personal identification number, and an internal key. The resulting response code is converted into DTMF tones and transmitted by telephone to a central computer which authenticates the caller. This system does not provide for encryption of messages, or authentication by the receiving party of communications forwarded by the central computer, and yet requires a challenge response form of authentication which requires simultaneous two-way communications, which is currently neither possible nor required by existing two-way wireless pager protocols.

U.S. Pat. No. 5,285,496 describes a paging system with two options: the first is to send and receive encrypted messages using private key encryption by transmitting a clear text message over a private communications line to a local client of the pager network where the message is encrypted using a private key, and broadcast over a pager network, and the second is to send the message in clear text by telephone directly to the central control system of the pager network, where the message is encrypted. However, neither of the two options provides for encryption of the original pager transmission, which must be sent in clear text form over a telephone line, and which, in the case where a local client computer is used, provides no way to maintain centralized control. In addition, for the local client computer option, in which the address is encrypted together with the message, the destination pager must decrypt every message sent over the system in order to determine whether a message is addressed to it, which is only possible in pager networks with a very limited number of participants.

In the system described in U.S. Pat. No. 5,638,450, on the other hand, reception by a pager of encrypted messages over a radio frequency pager network is made possible by having the pager transmit an encryption key via DTMF tones over a telephone line to a central office, the central office then encrypting the messages before forwarding them to the recipient. This system does not permit outgoing messages to be encrypted, and provides no way of key encrypting messages between two pagers on the network, and again is not applicable in the context of the present invention.

It will be appreciated that none of the above patents, representing the known pager message protection proposals, describes a system that enables true key encryption and authentication capabilities to be added to a conventional two-way wireless alphanumeric paging system of the type with which the present invention is concerned, using existing pager protocols and equipment, and in which any individual can send a simply alphanumeric message by keying the message into a miniature two-way pager (or choosing from a menu of pre-stored messages), entering a destination address, and pressing a send button, the message then being retrievable by the intended recipient by a simple keystroke on the recipient's pager, with the message being encrypted by a key unique to the sending pager and decrypted by a key unique to the destination pager. In contrast, the present invention not only provides these capabilities, but adds further levels of security by using strong secret or private key based encryption algorithms, with multi-tier authentication of a transmitted packet, while permitting central registration and billing for encryption services and recovery of messages by legal authorities without adding to carrier overhead or increasing the costs of the paging service for users who do not require encryption.

All of the above advantages of the system and method of the invention are made possible through the use of a proxy server to intercept an encrypted message and repackage it for delivery to the intended recipient in a form that the intended recipient is capable of reading, thus eliminating the need for shared keys or key exchange between the sender and ultimate recipient of the message or complex, hardware-intensive encoding schemes, and allowing encrypted messages to be transmitted using existing two-way alphanumeric pager protocols. Because the invention involves key encryption and not encoding of the message, and requires knowledge by the sending and receiving units of only one or two keys (for example, a private key unique to the pager and a server's public key), encryption being simpler to implement than encoding since it merely involves performing arithmetically combining the message with the key, the present invention can be used with existing pager hardware and protocols, and by avoiding the need for challenge/response authentication, the present invention can be used with existing channels and therefore with the existing pager infrastructure. None of the previously proposed systems and methods has these capabilities.

Not only does the use of a proxy server relieve the sending and receiving pagers of key management functions, but the manner in which the invention utilizes strong encryption capabilities, by separately encrypting the session key, further minimizes the processing resources required by the sending and receiving pagers. Essentially, encryption of the message itself can be carried out with a relatively short session key to minimize usage of the processor, while the relatively short session key can be protected by a strong encryption algorithm. Because the session key is not reused, key integrity can easily be maintained.

SUMMARY OF THE INVENTION

It is accordingly a first objective of the invention to provide a system of adding full key encryption services to a pager network, allowing key encrypted alphanumeric messages to be sent by any pager unit registered with the encryption service provider to any other registered pager unit via the network, as well as to e-mail addresses, fax machines and other destinations capable of receiving text messages.

It is a second objective of the invention to provide a method of adding full key encryption services to a pager network, allowing key encrypted messages to be sent by any pager unit registered with the encryption service provider to any other registered pager unit via the network, as well as e-mail addresses, fax machines and other destinations capable of receiving text messages.

It is a third objective of the invention to provide a system which allows encryption of alphanumeric messages by a paging unit for wireless transmission over a paging network in a manner which is transparent to the person sending the message, and which allows decryption and display of the messages by a receiving pager in a manner which is transparent to the person receiving the message.

It is a fourth objective of the invention to provide a method which allows encryption of messages by a paging unit for wireless transmission over a paging network in a manner which is transparent to the person sending the message, and which allows decryption and display of the messages by a receiving pager in a manner which is transparent to the person receiving the message.

It is a fifth objective of the invention to provide a system and method of adding encryption capabilities with centralized key management and unique secret keys for each user, without modification of existing pager network infrastructure or paging transmission protocols.

It is a sixth objective of the invention to provide a system and method of encrypting text messages capable of being transmitted over a pager network, which can be provided as an add-on or option to the services provided by the pager network, and which can be centrally managed using a proxy server connected to the network to provide the encryption services to subscribers who select the encryption option.

It is a seventh objective of the invention to provide a system and method of authenticating messages transmitted in encrypted form over a pager network, without the need for an authentication channel or challenge/response protocol.

It is an eighth objective of the invention to providing a standard alphanumeric pager unit with the capability of encrypting, decrypting, and authenticating messages transmitted using a two-way alphanumeric pager protocol, with minimal or no hardware modification.

It is a ninth objective of the invention to provide a proxy server arrangement which can be connected to the network operations center of a pager network in order to manage transmission of key encrypted messages over the network.

These objectives are achieved, in accordance with the principles of a preferred embodiment of the invention, by using a pager proxy server to carry out decryption of a message encrypted by a session key and received from the sending pager, and to have the pager proxy generate a new session key for re-encryption of the message transmitted to the receiving pager, with the original session key being encrypted at least by a secret key shared by the sending pager and the pager proxy server or by a public key corresponding to a private key of the pager proxy server, and the new session key being encrypted either by a secret key shared by the pager proxy server and the destination pager or a public key corresponding to a private key held by the destination pager, thereby freeing the sending and destination pagers from having to store more than one secret key or of having to carry out a direct exchange of keys, and allowing each pager on the network to be provided with a unique key.

In accordance with the principles of an especially preferred embodiment of the invention, in order to encrypt a message, the sending pager must have hard-coded into memory a unique identification number and a secret key associated with the identification number. When a user is ready to send an encrypted message, he or she begins by entering the message to be sent, after which the user is prompted for an access code to gain access to the encrypted shared key, the encrypted shared is decrypted, and a session key is generated. The message that was entered by the user is then encrypted with the session key, and the session key is encrypted with the public key of the pager proxy server, or a shared secret key of the sending pager, and appended to the encrypted message for transmission via the network operations center to the pager proxy server.

Pager messages are formatted in accordance with standard pager protocols to include a destination header, which is generally the address or telephone number of the receiving pager, and with an additional space in the header to indicate that the message is encrypted, as will be explained in more detail below. When the network operations center receives a message that is in encrypted form, it forwards it to the encryption service center, which must at least include a pager proxy server, using an appropriate protocol, examples of which include but are not limited to TME-X and TNPP. In the illustrated embodiment, the pager proxy server is included in a gateway server in order to enable the system to package e-mail messages for transmission in encrypted form to pagers on the pager network, or to package pager messages according to an e-mail protocol for transmission over a wired network such as the Internet to an e-mail address, but it will be understood by those skilled in the art that the pager proxy may be operated as a separate unit.

In the illustrated embodiment of the invention, the pager proxy server has the role of verifying the authenticity of the message sent by the sending pager, decrypting the data with its private key or alternatively with a secret key shared with the sending pager to obtain the session key that was generated by the sending pager, and decrypting the message with the session key generated by the sending pager. Once this is accomplished, the server generates a new session key to encrypt the message with, and then encrypts the session key with a secret key shared with the destination pager or with a public key corresponding to the private key of the destination pager, or alternatively with a secret key shared with the destination pager, the two entities being appended together and sent to the recipient pager. The destination pager, after receiving the encrypted message, alerts the user and, when the user is ready to read the encrypted page, prompts him or her for the access code to begin decryption of the appropriate shared secret key or private key, which is then used to decrypt the session key used to decrypt the message.

DETAILED DESCRIPTION OF THE PREFERRED EMBODIMENTS

Figure 1:
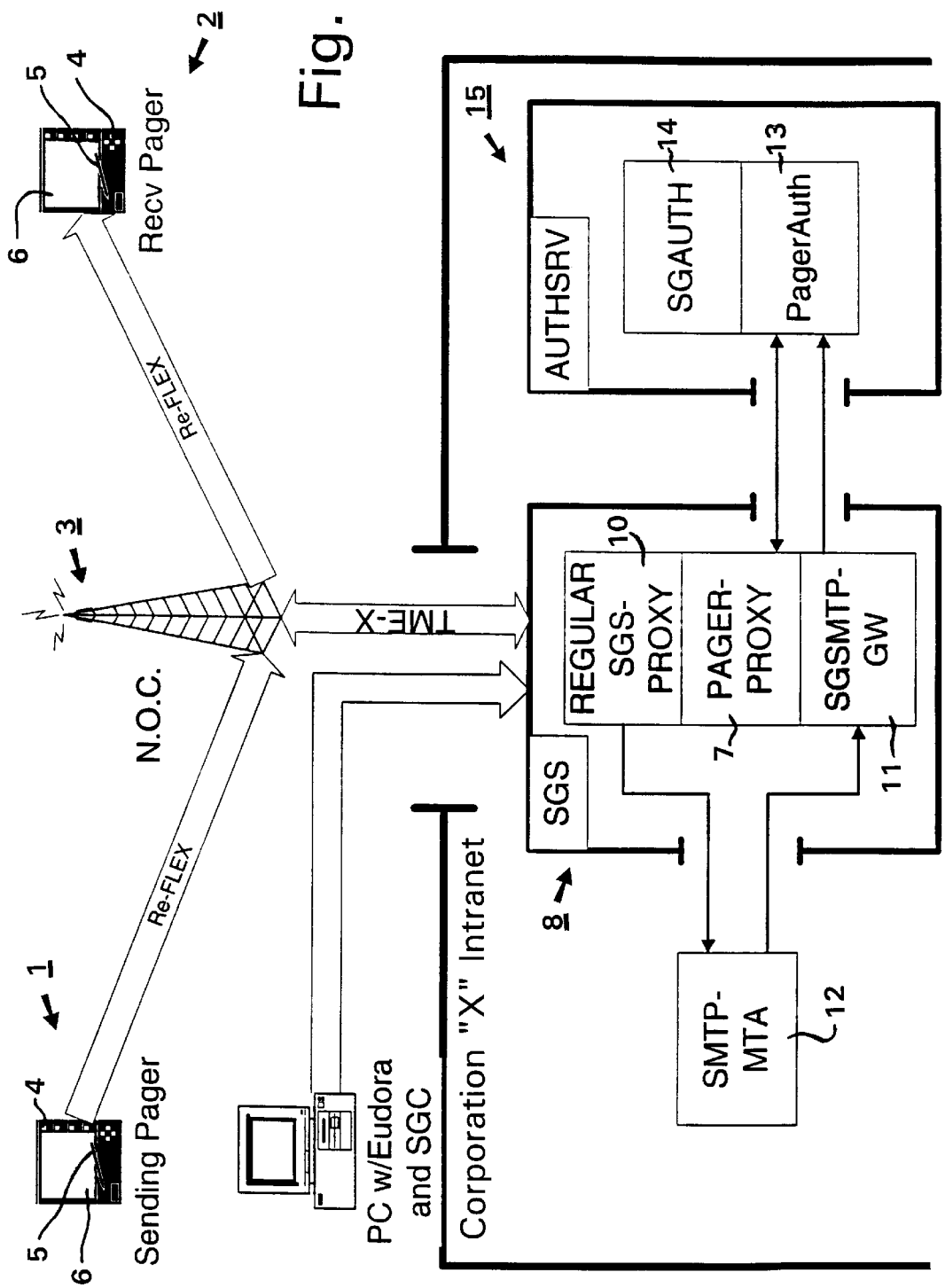
FIG. 1 is a schematic diagram showing the principal elements of a pager encryption system constructed according to the principles of a preferred embodiment of the invention.

As illustrated in FIG. 1, the system of the preferred embodiment of the invention allows encrypted communications between a sending pager and a receiving pager via a two-way wireless paging system such as M-TEL's system, using two-way alphanumeric pagers such as, but not limited to, the Motorola and Wireless Access pagers. The basic elements of the system are a sending pager 1, a receiving pager 2 which may be identical to the sending pager, and a network operations center (NOC) 3 which provides basic message forwarding and subscription management services for all communications carried by the system.

As is conventional, the sending and receiving or destination pagers (or pager units) 1 and 2 include function and data entry keys 4, and/or a stylus 5 or other data entry device, for allowing a user to input and send alphanumeric messages, and an LCD or other device 6 which allows received alphanumeric messages to be displayed. The pagers can also provide other functions such an alarm function to alert the user that a message has been received, and includes a microprocessor and circuitry capable of formatting an input message and transmitting it to the network operations center according to an appropriate protocols, including but not limited to the ReFLEX™ protocol. The sending and receiving or destination pagers also include a memory for storing a unique user identification number (UID) that identifies a particular pager for addressing purposes, and other information such as a password that can be used to prevent unauthorized users from accessing the transmission or message display functions of the pager, as well as an addressing mode (AM) generator that is used in the pager protocol to indicate the type of addressing used by the paging system, and a timer that can be used to generate a message number.

In order to be used with the system and method of the illustrated embodiment of the invention, the pager memory must also have stored therein at least a private key of the pager unit, a corresponding public key of the pager unit, and a public key corresponding to a private key of the server, for encrypting either the message itself or a session key used to encrypt the message, and software capable of running on the included processor for performing an encryption algorithm and a decryption algorithm. In addition, according to the preferred embodiment of the invention illustrated in FIGS. 2–10, the pager must be capable of generating a session key for each message to be transmitted, storing a private key unique to the pager which is used to authenticate the pager, and computing a message authentication code which is used to authenticate the message being transmitted or received.

It will be appreciated by those skilled in the art, however, that whenever a public key or private key is required, a shared secret key could be substituted using an appropriate algorithm, and that while the use of session keys is highly advantageous, the session key could also be eliminated in favor of public-private key encryption. In addition, while the illustrated system provides both encryption and decryption capabilities in at least two pagers, so that each pager can send or receive messages, the system and method of the invention could also be applied to systems in which some or all of the pagers have reception capabilities only, i.e., in which some or all of the pagers are designed to allow the pagers to receive encrypted messages originating from e-mail addresses and/or two-way pagers, but not to originate messages. Conceivably, the system and method of the invention could even be applied to systems in which at least some of the pagers are capable of sending encrypted messages, but not receiving and decrypting them, although such a system would seem to make little commercial sense. In any case, it will be appreciated that the system and method illustrated in FIGS. 2–10 are intended as being illustrative in nature only, and should not be interpreted as being limitative of the scope of the invention.

As indicated above, the number of keys required of a pager to encrypt and decrypt messages is at most two, so that the key storage requirements are minimal. The encryption algorithms themselves simply involve a series of mathematical steps, and are well within the capabilities of the microprocessors used in the conventional pagers, as are message authentication code generating techniques such as CRC or SHA1. The session key used in the preferred embodiment to encrypt the message itself consists, in a practical implementation, of just sixteen characters (128 bits), and thus encryption of the alphanumeric message using RC4 or a similar stream cipher or other algorithm which makes use of a shared secret key can be accomplished without a large amount of processing resources, while strong overall protection of the transmission is still provided because the more processor intensive encryption algorithms are reserved for encryption of the relatively small session key rather than the alphanumeric message itself. Of course, the session key is not limited to a particular bit size, and it is possible for example to use 256 bit session keys, or longer or shorter session keys as desired.

In the preferred embodiment, encryption of the session key is carried out by RSA (1024 bits) but other stronger private key algorithms such as ECC PK1 (~2500 bits) can also be used, as well as shared secret key-based encryption methods such as RC4. The public-private key encryption algorithms are preferred not only because of the strong encryption provided, but also because the permit authentication of the sender, as explained below, but legal or other considerations may also affect the choice of encryption algorithm, and thus the system of the invention is designed to permit the use of different mutually exclusive encryption algorithms by the sending and destination pagers.

The sending pager 1 illustrated in FIG. 1 transmits messages to the network operations center 3 in the form of a packet that includes a clear text applications header that tells the center to forward the text to the pager proxy server 7, which is conveniently though not essentially included in a gateway 8 capable of network communications as well as the pager encryption and decryption functions required by the present invention. Forwarding of the packet to the pager proxy or gateway server preferably involves use of a network data transfer protocol such as TME-X, although the manner in which the packet is forwarded to the proxy will depend on the wireless protocol used by the pager network and the capabilities of the network operations center. TME-X is a preferred transfer protocol for use with Re-FLEX encoded packets because of the presence of a TCP/IP stack in the standard format packets that allows the Re-FLEX™ protocol to communicate directly with computer networks.

The gateway 8 may include a general purpose proxy server 10 such as the one described in U.S. Pat. No. 5,602,918, entitled "Application Level Security System And Method," and also in U.S. patent application Ser. No. 08/917,341, filed Aug. 26, 1997, entitled "Multi-Access Virtual Private Network," both of which are incorporated herein by reference. The two patent documents describe a system currently available from V-One Corporation of Germantown, Maryland under the name SmartGate™ (SG in the figures) which is especially suitable for use with the pager proxy of the present invention, although the pager proxy server of the invention could also be used with other gateway servers, or without any network connection capabilities.

As illustrated, gateway 8 also includes a dedicated e-mail server or gateway 11, and e-mail protocol message transfer agent (MTA) 12 for transferring messages from the gateway server 10 to the e-mail gateway. Both the e-mail gateway 11 and pager proxy 7 may be physically incorporated in the gateway server or provided on independent or separate computers, and are connected to a pager authentication module 13 which may be physically incorporated into a general purpose gateway authentication module 14 of a separate authentication server 15, combined with the gateway server, or may be provided as an independent unit.

Computers on the network with capabilities of communicating with the general purpose proxy server are represented in FIG. 1 by computer 16, and include gateway client software that permits the computer to establish a secured communications path to the gateway server, as well as an e-mail program which packages messages in an appropriate format such as that provided by the SMTP protocol for transmission over the secured communications path established by the gateway client software. An example of an e-mail program is "Eudora™," although the use of standard protocols such as SMTP and Re-FLEX™ allows any e-mail program to communicate with the gateway and thence with the pager network, so that the system of the invention is not limited to use in connection with any particular e-mail program, the conventional pager network already being equipped to handle e-mail transmissions to or from the wireless network. The invention may be considered to apply equally to pager-to-pager communications, pager-to-email communications, and email-to-pager communications. In addition, it is possible that the invention could be adapted to communications originating from a fax machine, in which case the clear packet transmitted by the fax machine over a telephone line would be processed by a facsimile proxy for packaging and encryption by the pager proxy, and messages addressed to the fax machine would be decrypted by the pager proxy and forwarded to the facsimile proxy for transmission as clear text over a telephone line, the principles of the invention still being applicable to the encryption and decryption of the messages by the pager proxy and sending or receiving pagers.

Turning to the specific embodiment illustrated in FIGS. 2–10, the system and method of the invention take the form of modifications to the header of the transmission packet sent by the sending pager 1 and/or the pager proxy 7. Essentially in order to send messages over the paging system, the sending pager and pager proxy, (or pager proxy alone in the case of a message originating from computer 16 or a source of clear text messages such as a facsimile machine) generates a header which includes the information necessary to enable processing by the recipient of the packet, and in the case of the pager proxy, for forwarding of a repackaged packet to a destination address. The header should at least include the session key encrypted message, the encrypted session key, a sender identification number, and a destination header or address, but because the header format will vary if a protocol other than Re-FLEX™ is used, it should be appreciated that the other information contained in the illustrated header, and the position of the information, can be varied without departing from the scope of the invention, and the invention is intended to encompass headers formatted for other alphanumeric wireless paging protocols, as well as for encryption algorithms and authentication protocols other than the specific algorithms and protocols indicated.

Figure 2:
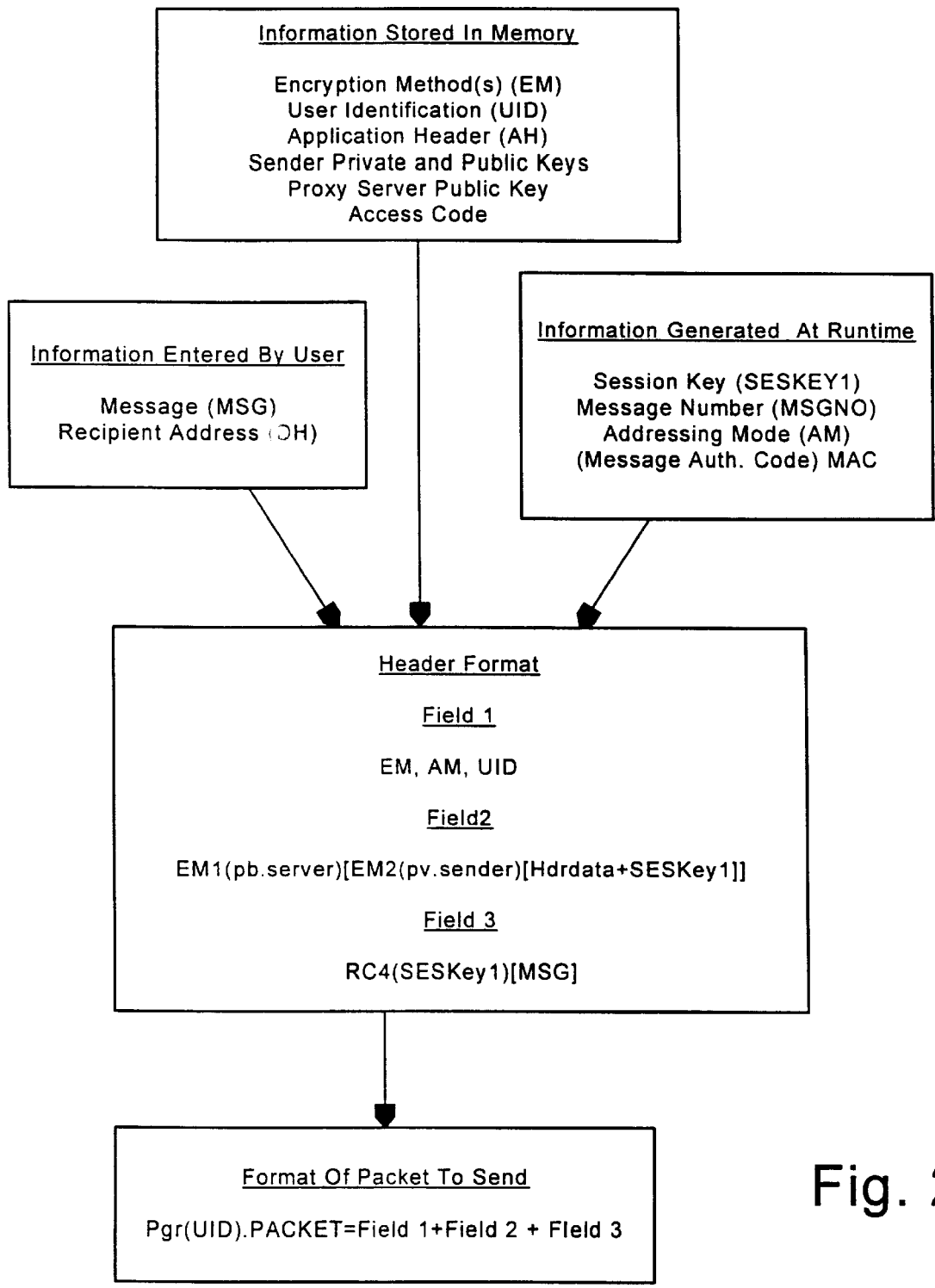
FIG. 2 is a schematic illustration summarizing the operation of the two-way pager for sending an encrypted message over a wireless network in accordance with the principles of a preferred embodiment of the invention.

FIG. 2 illustrates the format of the preferred header, which is divided into three fields. It is to be understood that while the illustration refers to the communication between the sending pager and the pager proxy, the same header will be used for the communication between the pager proxy and the destination pager, with appropriate substitutions of addresses and keys as explained in more detail below. As shown in FIG. 2, the first field is a clear text field that contains the encryption method indicator EM, pager addressing mode (AM), and user identification number (UID) (sometimes referred to as a PIN, but not to be confused with the password entered by the user to access pager functions), while the second field contains the encrypted session key (SESKey1) and various data referred to as "header data" (HdrData) including the destination header or address (DH) and a message authentication code (MAC), the information in the second field being encrypted by the unique private key of the sending pager (pv.sender) in order to authenticate the sender, and by a public key corresponding to a private key held by the server (pb.server) in order to protect the contents of this field. The third field contains the message encrypted by the session key.

The various fields illustrated in FIG. 2 may be formatted in any convenient manner permitted or required by the protocol used to package the data in the fields for transmission, but in the illustrated example most or all of the data in at least fields one and two can conveniently be in hexadecimal format. Whenever the drawings illustrate a hexadecimal number, the number ## will be preceded by a "0x" to form 0x##.

The encryption method indicator EM indicates which of the possible encryption methods handled by the server is being used to encrypt the session key and other information in field 2, so that the session key can be recovered and used to decrypt the encrypted message in field 3. As indicated above, possible encryption methods include the RC4 secret key encryption method, which requires the parties to the communication to have a shared secret key that is used for both encryption or decryption, and the RSA public key encryption method, which is the method illustrated in FIG. 2. The indicator itself is simply a number assigned to the encryption method. While any given pager will generally have only a single encryption method stored in memory, it is possible for the pager proxy to be arranged to handle multiple different methods and thus need to have an indication of the type of encryption method, to accommodate different pager systems or legal requirements, particularly if international pager traffic is involved.

The addressing mode (AM) indicates the type of address involved. For example, in the U.S., pager addressing modes are assigned one application header while e-mail addressing modes are assigned another application header. This indicator may not be necessary in all protocols since the destination header may be unique to a specific type of address, but is included in field 1 as part of the Re-FLEX™ protocol.

The user identification number (UID) included in clear text in field 1 and in encrypted form in field 2, is the unique address assigned to the pager, and is used to indicate the source of the message so as to enable the pager proxy to retrieve the appropriate public decryption key (pb.sender), and for use in authentication of the sender and for display by a receiving pager. Preferably, this number is hard-coded into memory so that it cannot easily be altered, and in current U.S. paging systems is in the form of a ten digit number.

The header data (HdrData) of the second field includes an application header (AH), which included in a field having variable length and string value the address mode and destination header (AM/DH), the user identification number (UID), which is the same as the one included in field 1, and a message number (MSGNO) and message authentication code (MAC). In addition, e-mail address protocols require a byte indicative of address length to be added where the address mode indicates an e-mail address.

For purposes of the present invention, the message number can be any arbitrary number, although the use of a time-related reference, as allowed by the Re-FLEX protocol, is useful for account tracking or billing purposes, and in addition can be used to ensure that received message is not a recording of a message sent earlier and intercepted by an unauthorized party. For example, the message number has previously been defined as the number of seconds since Jan. 1, 1970.

The message authentication code is a checksum used to verify that the recovered message is identical to the original message, and may be computed using an error correction code function such the cyclic recovery code (CRC) function, with CRCs being used in the illustrated embodiment or, alternatively, by computing a hash or one-way combination of the header data with the message and the session key, using an algorithm such as SHA1. By combining the message with other data to obtain the message authentication code in a way that can only recreated if the data used to recreate the code is the same as the data originally used to generate the code, the code can be used to authenticate the message, i.e., to verify that the message has not been altered since the time when the code was first generated, as will be described in more detail below. It will be appreciated that the exact form of the message authentication code is not a part of the present invention, and that any message authentication code may be used so long as it can be used to authenticate the message in the manner described below.

The three blocks above the header data in FIG. 2 indicate the source of the data for the various fields. The manner in which the data is combined to form the fields is described in more detail in connection with FIGS. 3–10, but the sources of the data may be summarized as (i) information entered by the user, which consists of the message (MSG) and the recipient address which forms the destination header, (ii) information stored in memory, including private and public keys of the pager, a public key of the pager proxy server, an access code which is to be compared with an access code input by the user, the encryption method indicator (EM), the user identification number (UID), and the application header, and (iii) information generated at runtime, i.e., during assembly of the packet header, including the session key (SESKey), the message number (MSGNO), the addressing mode (AM), and the message authentication code (MAC).

Figure 3:
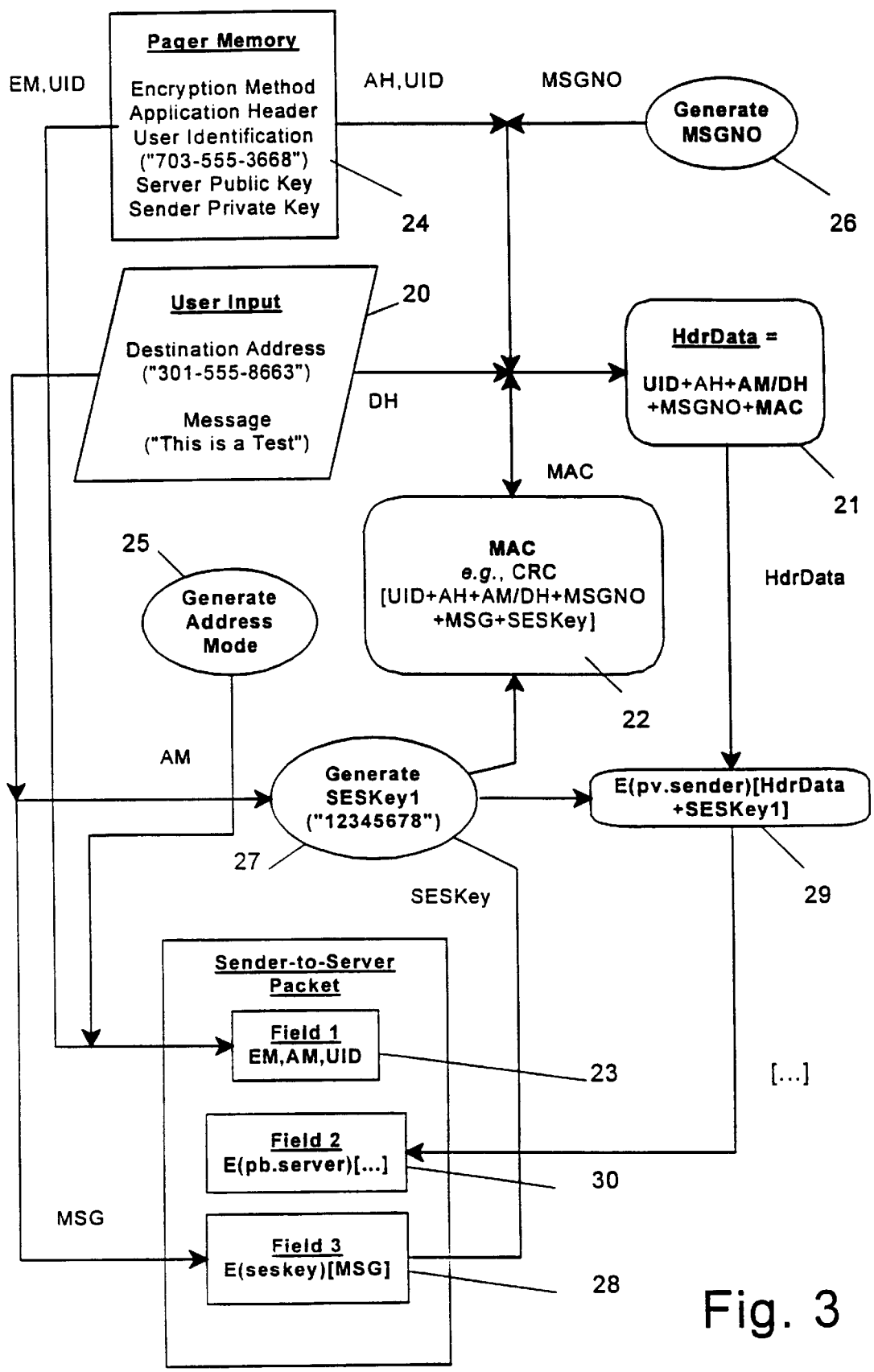
FIG. 3 is a functional block diagram of a module used by a two-way pager to encrypt a message and package it for wireless transmission over a pager network to a network operations center.
Figure 7:
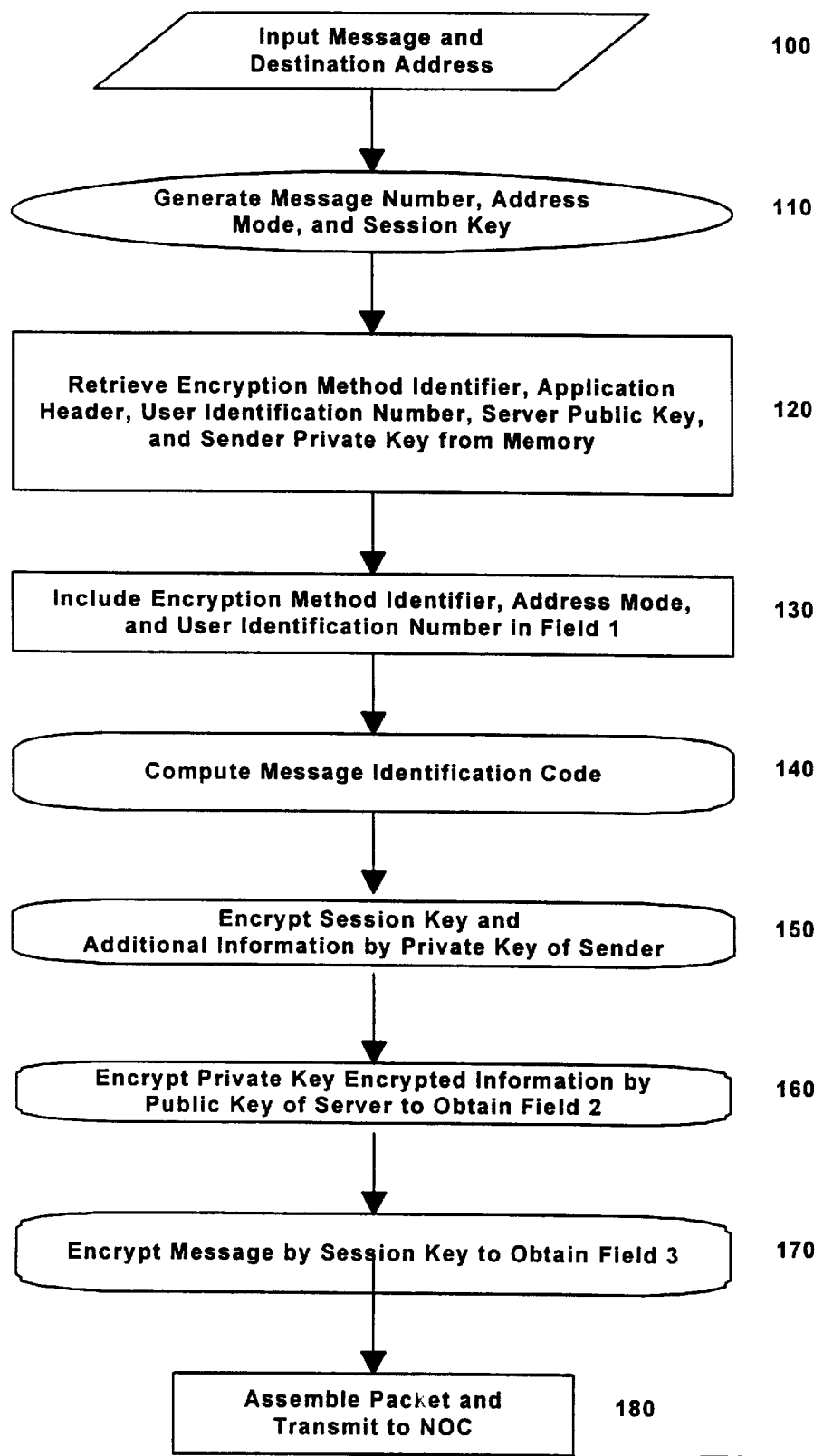
FIG. 7 is a flowchart of a preferred process corresponding to the functional block diagram of FIG. 3.

The details of the manner in which the data shown in FIG. 2 is assembled by sending pager 1 to form the header shown in FIG. 2 is illustrated in the functional block diagram of FIG. 3, as well as the flowchart of FIG. 7. As illustrated in FIG. 3, the pager 1 includes a user input 20 connected to keys 4 or stylus 5, which supplies the destination header (DH) to a functional block 21 which assembles the header data (HdrData), and to a functional block 22 which computes the message authentication code (MAC). In addition, the user input 20 supplies the message to functional block 28, the output of which is field 3 of the header.

Pager 1 also includes a memory 24 which stores the encryption method (EM), the application header (AH), the user identification number (UID) and the encryption method identifier (EM), which are supplied directly to functional block 23 for inclusion in field 1, the user identification number and application header being also supplied to functional block 21 for inclusion in the header data, which in turn is supplied to functional block 22 for inclusion in the message authentication code. The address mode (AM), which is associated with the destination header (DH) in the header data is generated by an address mode generator 25 which can be in the form of a look-up table, device that reads a particular identifying bit in the destination header, or other device, and the message number can be generated by a counter, timer, or other device 26 depending on the nature of the message number. Finally, the session key (SESKey1) for this embodiment of the invention is an eight character string generated by a random or pseudorandom number generator 27, which supplies the session key to functional block 28 for use in encrypting the message (MSG), to functional block 22 for inclusion in the message authentication code, and to functional block 29 for encryption together with the header data by the private key of the sender. The output of functional block 29 is supplied to functional block 30 for encryption by the public key of the server, the output of block 30 serving as field 2 of the header for the packet transmitted by the sending pager.

Figure 4:
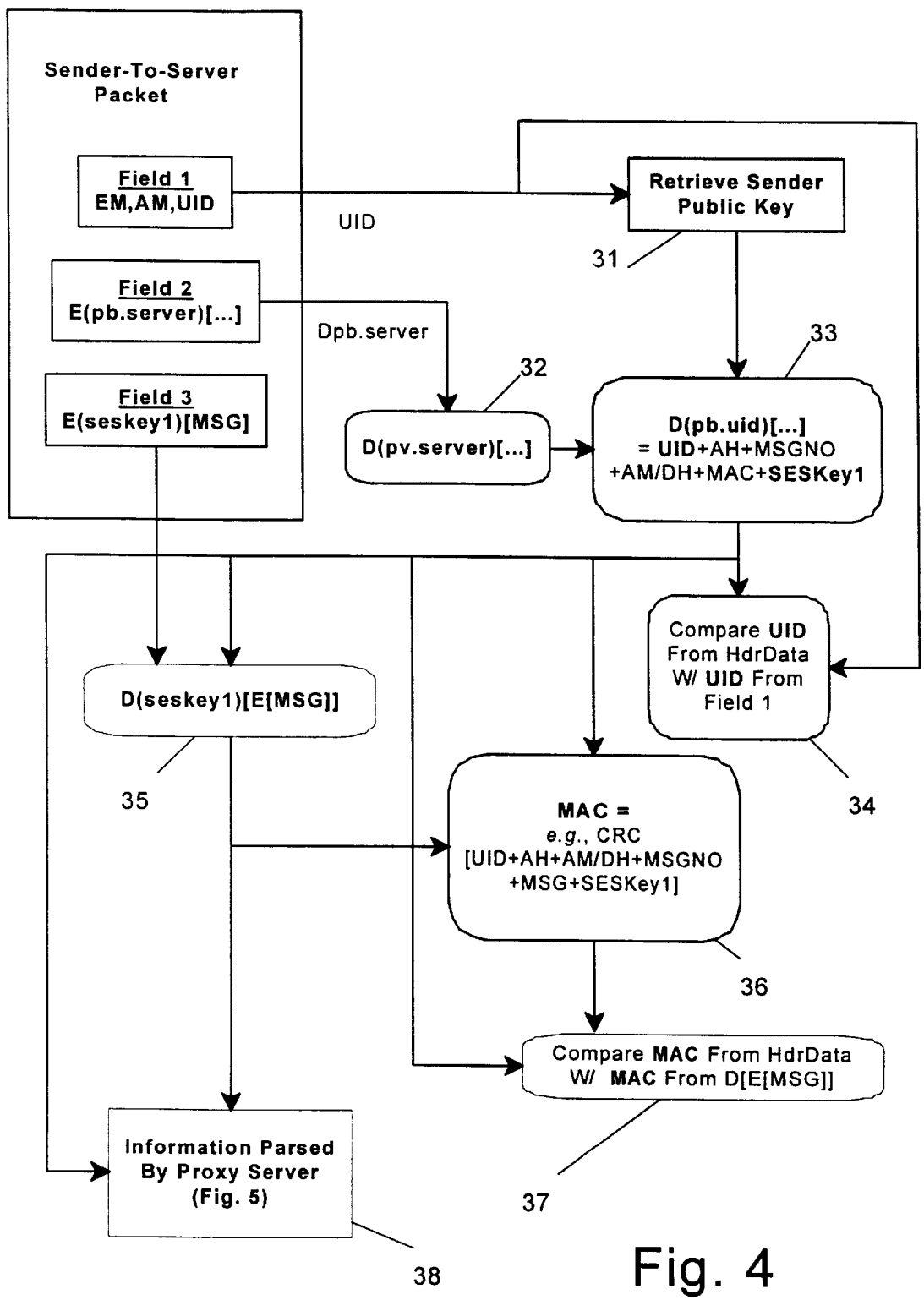
FIG. 4 is a functional block diagram of a module used by a pager proxy server to authenticate the sender of an encrypted message, authenticate the message, and extract information from the message which can be used to re-package the message for transmission a destination address.
Figure 5:
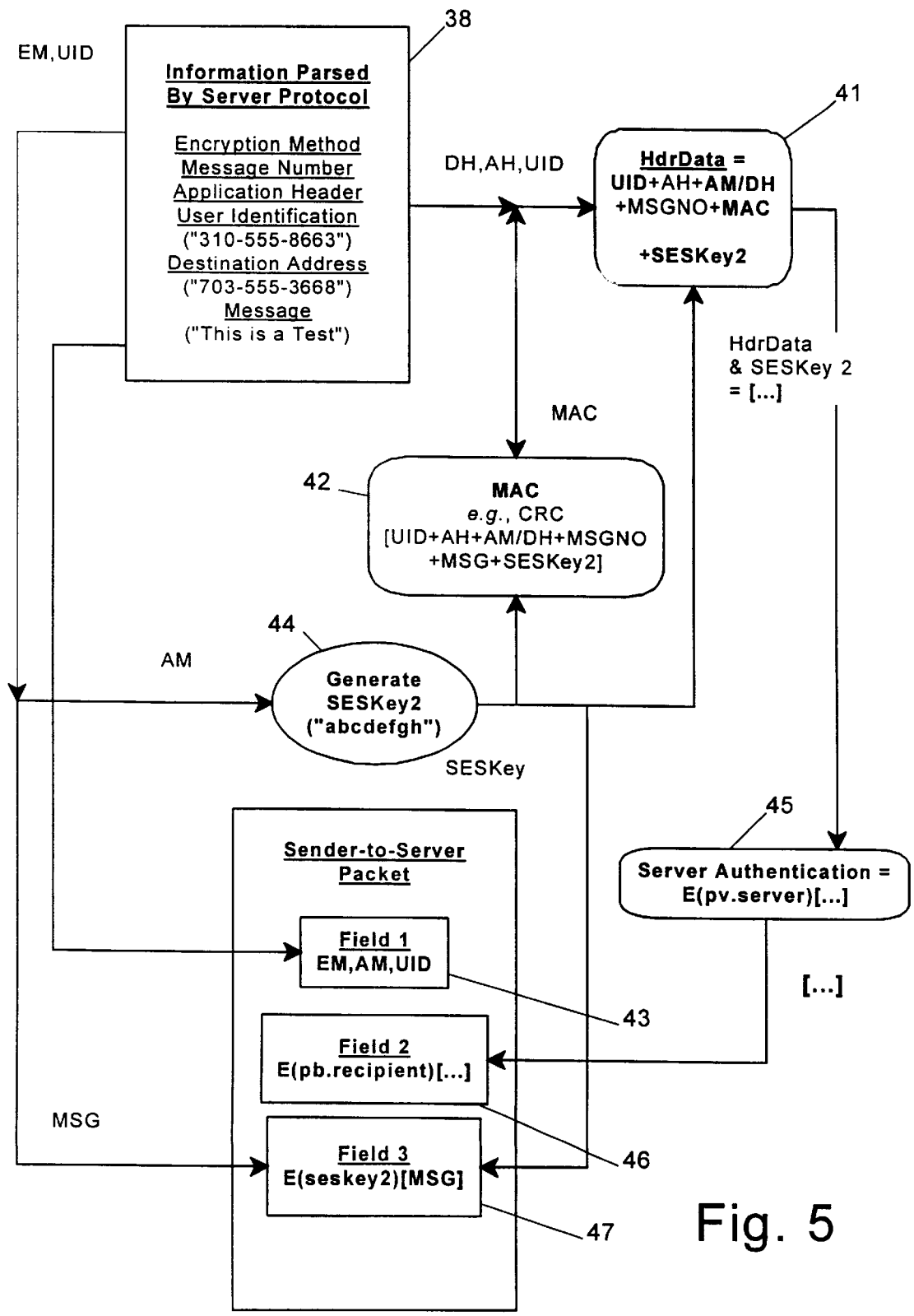
FIG. 5 is a functional block diagram of a module used by the pager proxy server to repackage a message and send it to the network operations center for transmission for re-transmission over the wireless pager network to a destination pager.
Figure 6:
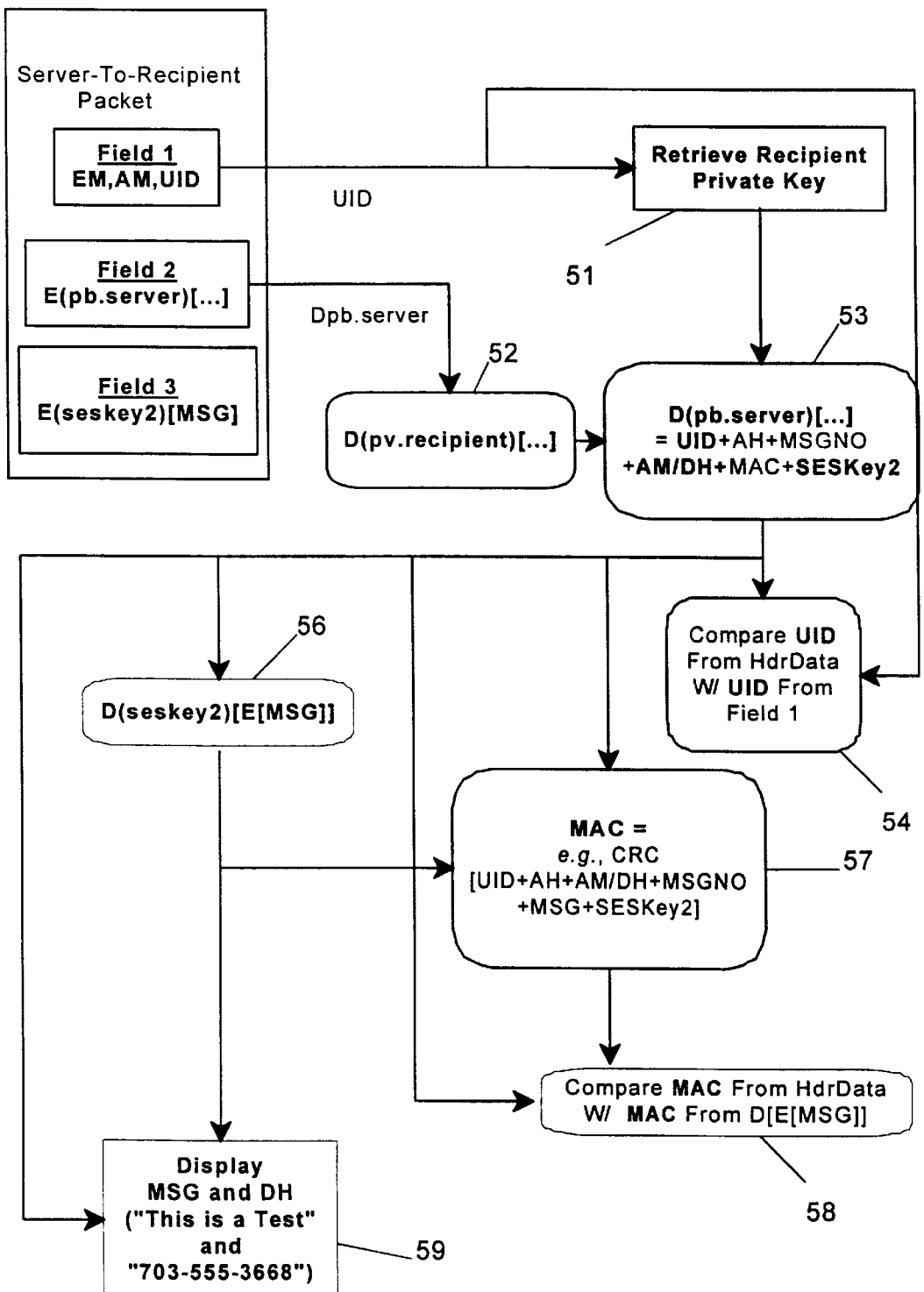
FIG. 6 is a functional block diagram showing the principal elements of a module used by a destination pager to decrypt and display a message received in encrypted form from the network operations center over the wireless paging network.

It will be appreciated by those skilled in the art that any of the functional blocks and data or number generators illustrated in FIG. 3, or in FIGS. 4–6, may be implemented either by hardware or software, and that while distinguishable by function, the functions may be carried out using common subroutines, hardware, or software.

Turning to FIG. 4, the pager proxy 7 includes a database of public keys corresponding to the unique public keys of pagers registered with the encryption service provider that operates the proxy server. The database is accessed by functional block 31 according to the clear text user identification number (UID) present in the header of a packet forwarded to the pager proxy by the network operations center. Field 2 is decrypted by functional block 32 using the private key of the server (pv.server) and by functional block 33 using the public key of the sender (pb.sender) to recover the session key, and the user identification number (UID) recovered from field 2 is compared by functional block 34 with the user identification number of field 1 to verify the authenticity of field 2 and recover the session key (SESKey1). A functional block 35 then uses the session key to decrypt the message (MSG).

The message recovered by the pager proxy is authenticated in functional block 37, by comparing the message authentication code recovered from field 2 with the output of a functional block 36 that computes the message authentication code based on the destination header (DH), application header (AH), user identification number (UID), message number (MSGNO), and session key (SESKey1) recovered from field 2, and the message recovered from field 3. The message, session key, and header data (HdrData) are then made available by functional block 38 to an encryption or repackaging module, illustrated in FIG. 5, for repackaging in a way that will enable decryption by a destination pager.

As shown in FIG. 5, the application header (AH) and message number (MSGNO) received from functional block 38 is provided to functional blocks 41 and 42 for inclusion in the header data and message authentication code, while the address mode (AM) and encryption method (EM) obtained from field 1 of the packet received from the sender is passed to functional block 43 or regenerated for inclusion as clear text in the packet header. In order to permit decryption and authentication of the repackaged header by the receiving pager, however, the destination header (DH) and user identification number (UID) are swapped, so that the original destination header is supplied by the pager proxy to functional blocks 41, 42, and 43 as the user identification number (UID), and the original user identification number are supplied to functional blocks 41 and 42 as the destination header (DH). Functional block 42 generates a message authentication code based on the new destination header (DH), application header (AH), user identification number (UID), message number (MSGNO), while a new session key (SESKey2) is generated by functional block 44 in the same manner as functional block 27 shown in FIG. 3, and the resulting message authentication code (MAC) together with the new session key and header data from functional block 41 are encrypted by functional block 45 using the private key of the server (pv.server) before being sealed by functional block 46 using the public key of the destination pager (pb.recipient) and included in the header as field 2. Functional block 47 receives the message and new session key and re-encrypts the message using the new session key and an algorithm such as RC4 to generate field 3, fields 1–3 being assembled into a packet 50 for transmission to the destination pager 2 via the network operations center 3.

Again, those skilled in the art will appreciate that all of the functional blocks illustrated as being present in the proxy server and/or proxy authentication module may be implemented as software, hardware, or a combination of software and hardware, and may be varied depending on the encryption method and requirements of the pager protocol.

In addition, those skilled in the art will appreciate that the illustrated embodiment could be modified by eliminating the session key and instead using public key encryption of the message. Alternatively, instead of having the pager proxy perform any decryption of the message, the original session key could simply be re-encrypted by the pager proxy using at least the public key of the destination pager as described above, or a secret key shared with the destination pager, in which the encrypted message would simply be forwarded to the destination pager unit with the session key re-encrypted so that it can be recovered by the destination pager. While neither of these options is currently preferred because elimination of the session key leaves transmissions vulnerable to recording, and elimination of message decryption by the pager proxy makes message authentication more difficult, they should nevertheless be considered to be within the scope of the invention.

Turning to FIG. 6, the destination pager 2 includes functional blocks mirroring those of the server for decrypting messages and authenticating packets received from the pager proxy 7 via the network operations center 3. These include functional block 51 for retrieving the server public key (pb.server) from memory, functional blocks 52 and 53 for decrypting the field 2 using the recipient private key (pv.recipient) and the server public key, functional block 54 for comparing the user identification number recovered from field 2 with the user identification number in field 1, functional block 56 for decrypting the message (MSG) using the session key (SESKey2) recovered from field 2, and functional blocks 57 and 58 for generating a message authentication code and comparing it with the message authentication code recovered from field 2. It will be noted that functional block 57 may also be used to generate a message authentication code for an outgoing message, avoiding duplication of the hardware or software which performs this function.

Finally, destination pager 2 includes a functional block 59 for displaying the message (MSG) and destination header (DH) corresponding to the user identification number of the sending pager, and for alerting the user as necessary that a message has been received. The display is identical to that used for an unencrypted message, and thus the decryption operation is entirely transparent to the user.

The method steps that implement the functions illustrated in FIGS. 3–6 are as follows:

First, as shown in FIG. 7, upon input of a message and destination address by the user of a pager (step 100), which may follow the input and verification of a password (not shown), a message number, address mode, and session key are generated (step 110) and the encryption method identifier, application header, user identification number, server public key, and sender private key are retrieved from memory (step 120). The encryption method identifier, address mode, and user identification number are included in field 1 (step 130), a message authentication code based on the destination header, application header, user identification number, message number, message, and session key is computed (step 140), and the application header, user identification number, destination header, message number, message authentication code, and session key are encrypted by the private key of the sending pager (step 150) and then by the public key of the pager proxy (step 160) to obtain field 2 of the packet header. Finally, the message is encrypted by the session key (step 170) to obtain field 3, and the packet header is transmitted via the network operations center to the pager proxy (step 180).

Figure 8:
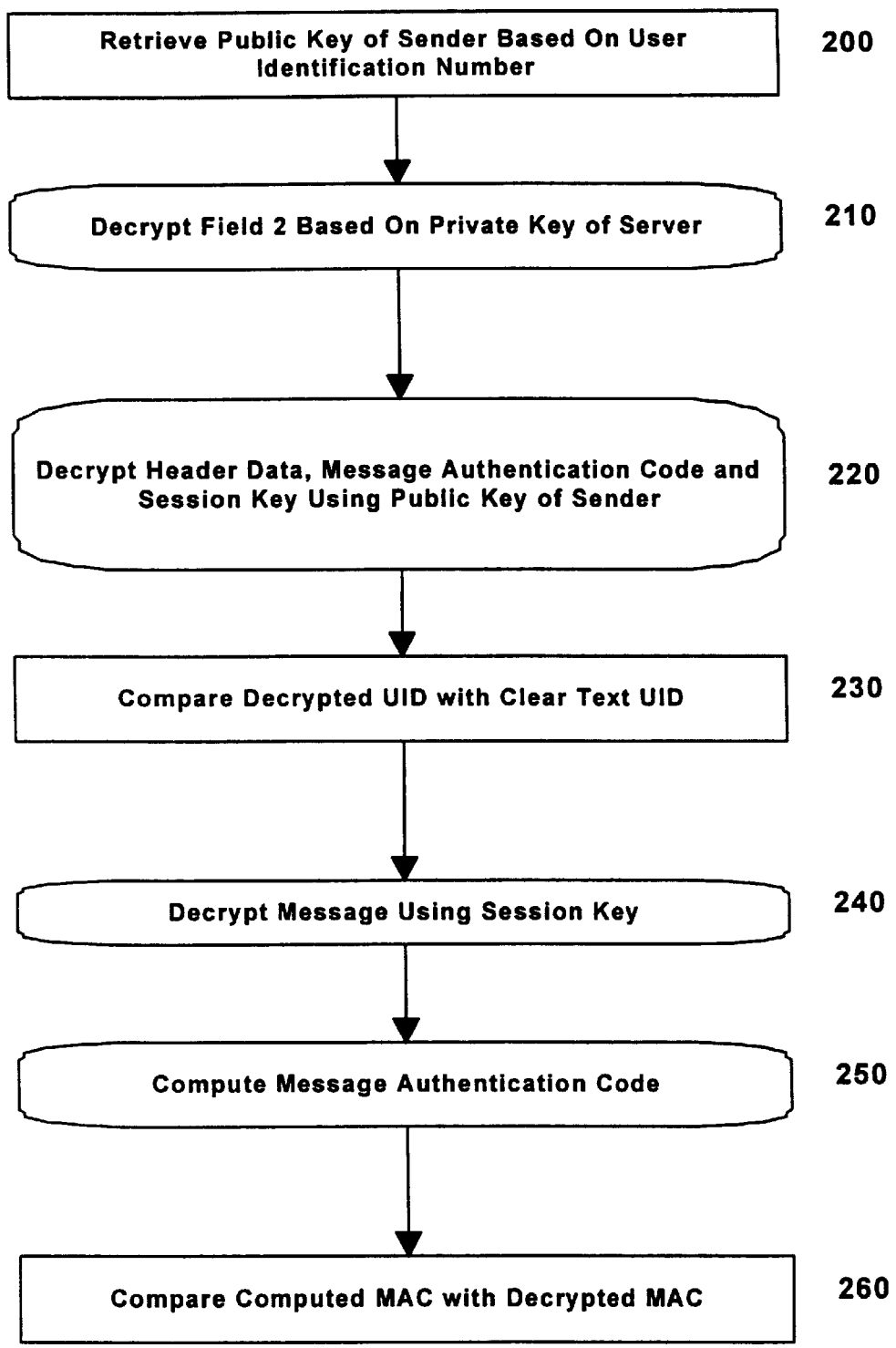
FIG. 8 is a flowchart of a preferred process corresponding to the functional block diagram of FIG. 4.

Upon receipt by the pager proxy, as shown in FIG. 8, the public key of the sending pager is retrieved based on the user identification number in field 1 (step 200), and field 2 of the packet is decrypted by the private key of the server (step 210) and then by the public key of the sending pager (step 220) based on the encryption method identified by the identifier in field 1. Authentication of the sender is provided by comparing the user identification number recovered from field 2 with the user identification number in field 1 (step 230), the message included in field 3 is decrypted using the session key recovered from field 2 (step 240), and authentication of the message is provided by generating a message authentication code based on the destination header, application header, user identification number, message number, and session key recovered from field 2 together with the decrypted message (step 250), and by then comparing the computed message authentication code with the message authentication code recovered from field 2 (step 260).

Figure 9:
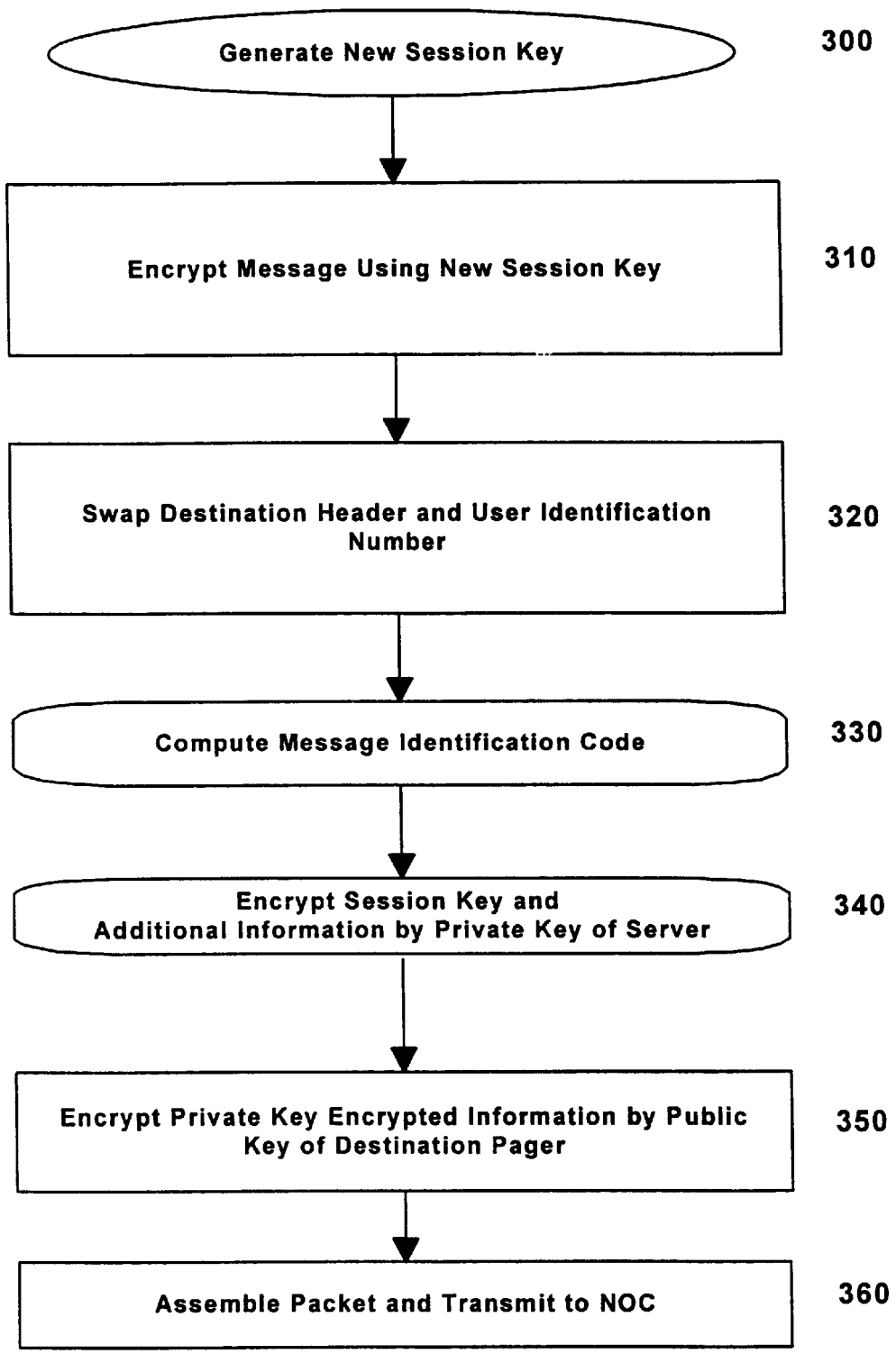
FIG. 9 is a flowchart of a preferred process corresponding to the functional block diagram of FIG. 5.

As illustrated in FIG. 9, after authenticating the information contained in field 2, the proxy server generates a new session key (step 300), encrypts the message using the new session key (step 310), assigns the original user identification as the new destination header and the original destination header as the new user identification number, computes a new message authentication code (step 330), encrypts the address header, message number, new user identification number, new destination header, new session key, and new message authentication code using the private key of the server (step 340), encrypts the result of step 340 using the public key of the destination pager (step 350), and assembles the header and packet for RF transmission to the destination pager via the network operations center (step 360).

Figure 10:
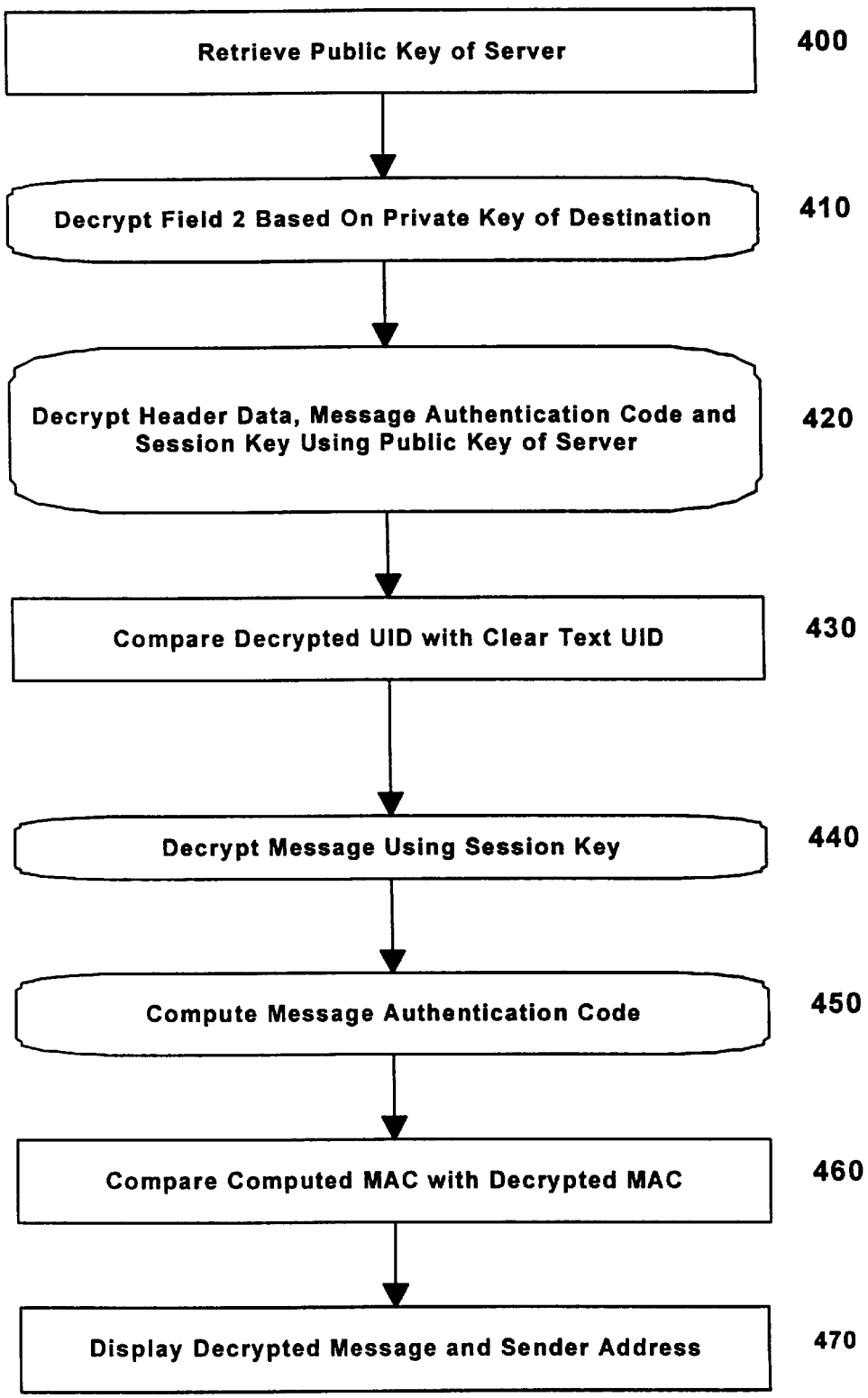
FIG. 10 is a flowchart of a preferred process corresponding to the functional block diagram of FIG. 6.

As illustrated in FIG. 10, upon receipt by the destination pager, as shown in FIG. 8, the public key of the pager proxy server is retrieved based on the user identification number in field 1 (step 400), and field 2 of the packet is decrypted by the private key of the destination pager (step 410) and then by the public key of the pager proxy server (step 420) based on the encryption method identified by the identifier in field 1. Authentication of the sender is provided by comparing the user identification number recovered from field 2 with the user identification number in field 1 (step 430), the message included in field 3 is decrypted using the session key recovered from field 2 (step 440), and authentication of the message is provided by computing a message authentication code based on the destination header, application header, user identification number, message number, and session key recovered from field 2 together with the decrypted message (step 450), and by then comparing the computed message authentication code with the message authentication code recovered from field 2 (step 460). Finally, after authentication of the user identification number and message, the user is alerted that a message has been received and the decrypted message and information contained in the destination header are displayed at the request of the user (step 470).

Having thus described a preferred embodiment of the invention in sufficient detail to enable those skilled in the art to practice the invention, it is nevertheless anticipated that numerous variations and modifications of the invention will occur to those skilled in the art, and it is intended that all such variations and modifications be included within the scope of the invention. For example, although the preferred embodiment of the invention has the pager proxy re-package the message by first decrypting it, and then re-encrypting it using a new session key, it is also within the scope of the invention to have the pager proxy decrypt only the session key and re-encrypt the same session key using the public key or shared secret key of the destination pager. Accordingly, it is intended that the above description not be taken as limiting, but rather that it be defined solely by the appended claims.

We claim:

1. A system for adding encryption services to an existing pager network, the pager network including a network operations center which provides a means for receiving an alphanumeric message from any of a plurality of handheld pager units and forwarding the alphanumeric message to another of the plurality of handheld pager units, at least two of said pager units comprising:

means for inputting an alphanumeric message and a destination address;

means for including the alphanumeric message in a packet for transmission to the destination address by wireless transmission via the network operations center;

means for receiving an alphanumeric message from the network operations center; and means for displaying the alphanumeric message received from the network operations center; and a memory, wherein the system for adding encryption services comprises:

means in at least one of said pager units for generating a first session key, encrypting a message using the first session key, retrieving an encryption key from said memory, encrypting the first session key using said retrieved encryption key, and transmitting the encrypted message and the encrypted first session key via the network operations center to another of said pager units;

means in said another one of said pager units for decrypting and displaying the encrypted message; and a pager proxy server including means for receiving a packet containing the encrypted message that has been sent to the network operations center, decrypting the first session key and at least a portion of the packet, and re-encrypting said portion of the packet for delivery to said another of said pager units via said network operations center.

2. A system as claimed in claim 1, wherein said encryption key is a public key corresponding to a private key held by the pager proxy server so that the session key can be recovered only by the paging proxy server.

3. A system as claimed in claim 2, wherein said sending pager unit further comprises means for encrypting at least the first session key by a private key of the sending pager unit, and wherein said pager proxy server includes means for retrieving a public key corresponding to the private key of the sending pager unit for use as a first level authentication of the sending pager unit.

4. A system as claimed in claim 3, further comprising means for appending a unique user identification number of the sending pager unit to the header in clear text form, said user identification number being hard-coded into the sending pager unit.

5. A system as claimed in claim 4, wherein said means for encrypting at least the session key by a private key of the sending pager unit also encrypts the user identification number of the sending pager unit, and said paging proxy server includes means for decrypting the encrypted user identification number together with the first session key and comparing it with the clear text user identification number in order to authenticate the contents of the field containing the encrypted user identification number and first session key.

6. A system as claimed in claim 3, wherein said secret key is a first session key generated by a sending pager unit and said first session key is encrypted by a stream cipher that uses a shared secret key.

7. A system as claimed in claim 3, wherein an encryption algorithm used to encrypt the first session key is a public-private key encryption algorithm.

8. A system as claimed in claim 3, wherein the sending pager further comprises means for adding an encryption method identifier in clear text to the packet header.

9. A system as claimed in claim 3, wherein the sending pager unit further comprises means for generating a first message authentication code based on various header data and the message and encrypting the various information together with the session key and the first message authentication code using the private key of the sending pager unit, and wherein the pager proxy server further comprises means for decrypting the various header data, first message authentication code, and session key using a public key corresponding to the private key of the sending pager unit, decrypting the message using the session key, generating a second message authentication code based on the message and various header data, and comparing the first message authentication code with the second message authentication code in order to authenticate the message.

10. A system as claimed in claim 9, wherein said message authentication code is an error correction code function.

11. A system as claimed in claim 9, wherein said various header data includes at least a user identification number of the sending pager and a destination header corresponding to the input address of the destination pager.

12. A system as claimed in claim 11, wherein said various header data further includes a message number and application header.

13. A system as claimed in claim 1, wherein said sending pager unit further comprises means for generating an address mode and appending the address mode in clear text to the packet header.

14. A system as claimed in claim 13, wherein said address mode indicates an address type selected from the group consisting of pager address types and e-mail address types, and wherein the pager proxy server is connected to a computer network gateway server and includes means for re-packaging said message in an e-mail packet and transmitting the e-mail packet via said computer network server to an e-mail address.

15. A system as claimed in claim 14, further comprising means for receiving e-mail packets from said computer network gateway server, and re-packaging said e-mail packets for transmission to the destination pager unit via said network operation center, and means for repackaging packets received from the network operations center for forwarding to an e-mail server.

16. A system as claimed in claim 1, wherein said means included in the pager proxy server for decrypting at least a portion of the packet includes means for decrypting a portion of the packet containing said first session key.

17. A system as claimed in claim 16, wherein said pager proxy server further includes means for decrypting said message using said first session key, means for generating a second session key, and means for re-encrypting the message using the second session key.

18. A system as claimed in claim 17, wherein said means for re-encrypting said portion of the packet includes means for encrypting the second session key by a secret key.

19. A system as claimed in claim 18, wherein said means for encrypting said portion of the packet by a secret key includes means for re-encrypting the second session key by a public key corresponding to a private key of a destination pager unit.

20. A system as claimed in claim 19, wherein said means for encrypting said portion of the packet by a secret key further includes means for, before re-encrypting the second session key by the public key corresponding to a private key of the destination pager, encrypting the second session key and various additional data by a private key of the pager proxy server.

21. A system as claimed in claim 20, wherein said additional data includes a second user identification number, said second user identification number corresponding to a first destination header included in said decrypted portion of the packet received from the sending pager unit, and wherein said destination paging unit includes means for comparing said second user identification number encrypted with said second session key to a clear text version of the second user identification number received from the pager proxy server in order to authenticate the pager proxy server.

22. A system as claimed in claim 21, wherein said additional data includes a second destination header corresponding to the first user identification number, and wherein said second pager unit includes means for displaying information included in said second destination header in order to indicate an address of the sending pager unit.

23. A system as claimed in claim 21, wherein said additional data includes a second destination header corresponding to the first user identification number, a message number recovered from said decrypted portion of the packet received from the sending pager unit, and an application number.

24. A system as claimed in claim 21, wherein said pager proxy server further comprises means for generating a message authentication code based on said message, said second session key, and said additional data, and said destination pager unit includes means for recovering said additional data and computing a message authentication code based on the additional data, said second session key, and said message in order to authenticate said message.

25. An encryption method according to which encryption services may be added to an existing two-way wireless pager network, the pager network including a network operations center which provides a means for receiving an alphanumeric message from any of a plurality of handheld pager units and forwarding the alphanumeric message to another of the plurality of handheld pager units, comprising the steps of:
  causing one of said pager units to perform the steps of generating a first session key, encrypting a message using the first session key, retrieving an encryption key from a memory of said pager unit, encrypting the first session key using said retrieved encryption key, including the encrypted message and the encrypted first session key in a wireless transmission packet, and transmitting the encrypted message from said one of said pager units to a pager proxy server via the network operations center,
  causing the pager proxy server to perform the steps of receiving the encrypted message and repackaging it for transmission to another of said pager units via the network operations center; and
  causing said another of said pager units to perform the steps of decrypting and displaying the encrypted message,
    wherein said step of repackaging the encrypted message for transmission includes the step of causing the pager proxy server to encrypt, using a secret key, a portion of the packet containing a first session key used by a sending pager unit to encrypt said portion of the packet,
    wherein said pager proxy server further performs the steps of decrypting said message using said first session key, generating a second session key, and re-encrypting the message using the second session key,
    wherein said pager proxy server further performs the step of encrypting the second session key by a secret key,
    wherein said step of encrypting said portion of the packet by a secret key includes the step of re-encrypting the second session key by a public key corresponding to a private key of a destination pager unit, and
    wherein said step of encrypting said portion of the packet by a secret key further includes the step of, before re-encrypting the second session key by the public key corresponding to a private key of the destination pager, encrypting the second session key and various additional data by a private key of the pager proxy server.

26. A method as claimed in claim 25, wherein said encryption key is a public key corresponding to a private key held by the pager proxy server.

27. A method as claimed in claim 26, wherein said sending pager unit further performs the step of encrypting at least the first session key by a private key of the sending pager unit, and wherein said pager proxy server performs the step of retrieving a public key corresponding to the private key of the sending pager unit for use as a first level authentication of the sending pager unit.

28. A method as claimed in claim 27, further comprising of the step of appending a unique user identification number of the sending pager unit to the header of the transmission to the paging proxy server in clear text form, said user identification number being hard-coded into the sending pager unit.

29. A method as claimed in claim 28, wherein said step of encrypting at least the session key by a private key of the sending pager unit includes the step of encrypting the user identification number of the sending pager unit, and said paging proxy server further performs the steps of decrypting the encrypted user identification number together with the first session key and comparing it with the clear text user identification number in order to authenticate the contents of the field containing the encrypted user identification number and first session key.

30. A method as claimed in claim 27, wherein an encryption algorithm used to encrypt the first session key is a public-private key encryption algorithm.

31. A method as claimed in claim 30, wherein said sending pager unit further performs the step of generating an address mode and appending the address mode in clear text to the packet header.

32. A method as claimed in claim 31, wherein said address mode indicates an address type selected from the group consisting of pager address types and e-mail address types, and wherein the pager proxy server is connected to a computer network gateway server and further performs the step of re-packaging said message in an e-mail packet and transmitting the e-mail packet via said computer network server to an e-mail address.

33. A method as claimed in claim 32, further performs the steps of receiving e-mail packets from said computer network gateway server, and re-packaging said e-mail mail packets for transmission to the destination pager unit via said network operation center.

34. A method as claimed in claim 27, wherein the sending pager unit further performs the step of computing a first message authentication code based on various header data and the message and encrypting the various information together with the session key and the first message authentication code using the private key of the sending pager unit, and wherein the pager proxy server further performs the steps of decrypting the various header data, first message authentication code, and session key using a public key corresponding to the private key of the sending pager unit, decrypting the message using the session key, generating a second message authentication code based on the message and various header data, and comparing the first message authentication code with the second message authentication code in order to authenticate the message.

35. A method as claimed in claim 34, wherein said message authentication code is an error correction code function.

36. A method as claimed in claim 34, wherein said various header data includes at least the user identification number of the sending pager and a destination header corresponding to the input address of the destination pager.

37. A method as claimed in claim 36, wherein said various header data further includes a message number and application header.

38. A method as claimed in claim 36, wherein the sending pager further performs the step of adding an encryption method identifier in clear text to the packet header.

39. A method as claimed in claim 25, wherein said first session key is encrypted by a stream cipher that uses a shared secret key.

40. A method as claimed in claim 25, wherein said additional data includes a second user identification number, said second user identification number corresponding to a first destination header included in said decrypted portion of the packet received from the sending pager unit, and wherein said destination paging unit perform the step of comparing said second user identification number encrypted with said second session key to a clear text version of the second user identification number received from the pager proxy server in order to authenticate the pager proxy server.

41. A method as claimed in claim 40, wherein said additional data includes a second destination header corresponding to the first user identification number, and wherein said second pager unit performs the step of displaying information included in said second destination header in order to indicate an address of the sending pager unit.

42. A method as claimed in claim 40, wherein said pager proxy server further performs the step of computing a message authentication code based on said message, said second session key, and said additional data, and said destination pager unit further performs the step of recovering said data and computing a message authentication code based on the additional data, said second session key, and said message in order to authenticate said message.

43. A method as claimed in claim 40, wherein said additional data includes a second destination header corresponding tot he first user identification number, a message number recovered from said decrypted portion of the packet received from the sending pager unit, and an application number.

44. A system for adding encryption services to an existing pager network, the pager network including a network operations center which provides a means for receiving an alphanumeric message from any of a plurality of handheld pager units and forwarding the alphanumeric message to another of the plurality of handheld pager units, at least two of said pager units comprising:

means for inputting an alphanumeric message and a destination address;

means for including the alphanumeric message in a packet for transmission to the destination address by wireless transmission via the network operations center;

means for receiving an alphanumeric message from the network operations center; and means for displaying the alphanumeric message received from the network operations center; and said system further comprising:

a pager proxy server including means for receiving a packet containing the encrypted message that has been sent to the network operations center, decrypting at least a portion of the packet, and re-encrypting said portion of the packet for delivery to said another of said pager units via said network operations center, wherein said handheld pager units are further arranged to utilize a key to encrypt said alphanumeric message before inclusion in said packet.

45. A system as claimed in claim 44, wherein said key is a unique session key generated each time a message is encrypted.

46. A system as claimed in claim 45, wherein each of said handheld pager units includes a memory for storing an encryption key, and is arranged to encrypt said session key using said encryption key.

47. A system as claimed in claim 46, wherein said encryption key is a public key corresponding to a private key held by said pager proxy server.

48. A system as claimed in claim 47, wherein said pager proxy server is further arranged to authenticate said packet.

49. A system as claimed in claim 48, wherein each of said handheld pager units is arranged to retrieve a private key from said memory and encrypt said encrypted session key using the private key to thereby provide said pager proxy server with a way of authenticating said message.

50. A system as claimed in claim 44, wherein said pager proxy server is further arranged to authenticate said packet.

51. A system as claimed in claim 49, wherein each of said handheld pager units is arranged to retrieve a private key from said memory and encrypt said encrypted session key using the private key to thereby provide said pager proxy server with a way of authenticating said message.

* * * * *